United States Patent [19]

Otori

[11] Patent Number: 5,605,053
[45] Date of Patent: Feb. 25, 1997

[54] HEAT PUMP TYPE AIR CONDITIONER AND METHOD FOR CONTROLLING A HEAT PUMP TYPE AIR CONDITIONER

[75] Inventor: Masahiko Otori, Shizuoka-ken, Japan

[73] Assignee: Kabushiki Kaisha Toshiba, Kawasaki, Japan

[21] Appl. No.: 501,710

[22] Filed: Jul. 12, 1995

[30] Foreign Application Priority Data

Jul. 13, 1994 [JP] Japan .................................. 6-161274

[51] Int. Cl.$^6$ .................................................. F24F 11/00
[52] U.S. Cl. ............................... 62/180; 62/181; 62/160; 62/228.4
[58] Field of Search ............................ 62/180, 181, 183, 62/184, 186, 160, 404, 428, 429, 228.4, 228.5

[56] References Cited

U.S. PATENT DOCUMENTS

| | | | |
|---|---|---|---|
| 4,364,237 | 12/1982 | Cooper et al. | 62/181 X |
| 5,257,508 | 11/1993 | Powell et al. | 62/180 |
| 5,385,030 | 1/1995 | Kitagawa et al. | 62/181 X |

FOREIGN PATENT DOCUMENTS

| | | |
|---|---|---|
| 57-62348 | 4/1982 | Japan . |
| 58-83142 | 5/1983 | Japan . |

*Primary Examiner*—Harry B. Tanner
*Attorney, Agent, or Firm*—Cushman Darby & Cushman IP Group of Pillsbury Madison & Sutro LLP

[57] ABSTRACT

A heat pump type air conditioner having a refrigeration circuit including a variable speed compressor, a four-way valve, an indoor heat exchanger, an expansion device and an outdoor heat exchanger, and capable of operating in a cooling mode to cool a room and a heating mode to heat the room. The compressor speed is set in accordance with air conditioning load, such as the temperature difference between a setting room temperature and the actual room air temperature and the operation mode. An outdoor fan blows air through the outdoor heat exchanger which selectably rotates at a high speed or a low speed. The rotational speed of the outdoor fan is selected based on the operation mode, a cooling mode reference compressor rotational speed value, a heating mode reference compressor rotational speed value and the set compressor rotational speed. The cooling mode reference compressor rotational speed value is smaller than the heating mode reference compressor rotational speed value.

13 Claims, 7 Drawing Sheets

Fig. 3

| ΔT = Ts−Ta (°C) | COOLING MODE | | HEATING MODE | |
|---|---|---|---|---|
| | f (Hz) | OUTDOOR FAN SPEED | f (Hz) | OUTDOOR FAN SPEED |
| ΔT ≥ 3 | 90 | H | OFF | OFF |
| 3 > ΔT ≥ 2 | 60 | H | OFF | OFF |
| 2 > ΔT ≥ 1 | 40 | H | 10 | L |
| 1 > ΔT ≥ 0 | 30 | H | 20 | L |
| 0 > ΔT ≥ −1 | 25 | H | 40 | H |
| −1 > ΔT ≥ −2 | 10 | L | 60 | H |
| −2 > ΔT ≥ −3 | OFF | OFF | 80 | H |
| −3 > ΔT ≥ −4 | OFF | OFF | 100 | H |
| −4 > ΔT | OFF | OFF | 130 | H |

HEAT PUMP TYPE AIR CONDITIONER AND METHOD FOR CONTROLLING A HEAT PUMP TYPE AIR CONDITIONER

BACKGROUND OF THE INVENTION

1. Field of Invention

The present invention relates to a heat pump type air conditioner and a method for controlling a heat pump type air conditioner.

2. Description of Related Art

Conventional air conditioners have an outdoor fan blowing outdoor air through an outdoor heat exchanger. In the air conditioner, the rotational speed of the outdoor fan is controlled in order to improve the heat exchange efficiency and to prevent an excessive pressure from developing in the refrigeration circuit.

Recently, air conditioners with an inverter controlling the rotational speed of a compressor have been developed. In these air conditioners, the rotational speed of the outdoor fan is controlled based on the compressor rotational speed, that is the output frequency of the inverter. For example, when the compressor rotational speed is high, a large amount of refrigerant flows in the outdoor heat exchanger. Under this condition, more air must pass through the outdoor heat exchanger. Therefore, when the compressor rotational speed is high, the rotational speed of the outdoor fan is set high. Conversely, when the compressor rotational speed is low, the outdoor fan rotational speed is set low. By this outdoor fan speed control, high heat exchange efficiency can be obtained and wasteful power consumption can be avoided.

This outdoor fan control can be used in a heat pump type air conditioner which is able to operate in both a cooling mode and a heating mode. The outdoor fan speed is controlled according to a flow-chart shown in FIG. 8. After the air conditioner starts, the outdoor fan control circuit determines whether the compressor rotational speed, or the inverter output frequency f, is more than 40 Hz (step S1). If it is more than 40 Hz, the outdoor fan is operated at a "High"0 speed (step S2). If not, the outdoor fan is operated at a "Low" speed (step S3). The threshold value of 40 Hz is usually determined as the reference in the heating mode, which requires a greater air conditioning capacity, and the outdoor air flow during "High Speed" or during "Low Speed" is set so that the heating operation efficiency will be high.

However, recently, efforts have been made to improve energy-savings and operating efficiency (COP). However, control of the outdoor air flow, that is, control of the outdoor fan speed, has simply followed the prior art control pattern described above.

Thus, despite the fact that a heat pump can operate in either a cooling mode or a heating mode, nothing other than switching between "High Speed" and "Low Speed" has occurred, taking the specified compressor rotational speed of 40 Hz as a reference value.

SUMMARY OF THE INVENTION

It is an object of the invention to provide an improved heat pump type air conditioner which is able to operate in both a heating mode and a cooling mode.

It is another object of the invention to provide an improved method for controlling a heat pump type air conditioner which is able to operate in both a heating mode and a cooling mode.

It is another object of the invention to improve the efficiency of air conditioning and reduce power consumption in both the heating mode and the cooling mode.

To achieve the above objects, the present invention provides an improved heat pump type air conditioner and method for controlling a heat pump type air conditioner. The heat pump has a refrigeration circuit including a variable speed compressor, a four-way valve, an indoor heat exchanger, an expansion device and an outdoor heat exchanger. The position of the four-way value controls whether the heat pump is operating in a cooling mode to cool a room or heating mode to heat the room. The compressor speed is set in accordance with the air conditioning load, e.g., the temperature difference between a setting room temperature and an actual room air temperature, as it relates to the operation mode. An outdoor fan blows air through the outdoor heat exchanger which selectably rotates at a high speed and a low speed. The rotational speed of the outdoor fan is selected based on the operation mode, a cooling mode reference compressor rotational speed value, a heating mode reference compressor rotational speed value and the compressor rotational speed. The cooling mode reference compressor rotational speed value is smaller than the heating mode reference compressor rotational speed value.

BRIEF DESCRIPTION OF THE DRAWINGS

In the accompanying drawings:

FIG. 3 is a table showing the relationship between the temperature difference between the room air temperature and a setting room temperature, an inverter output frequency and an outdoor fan speed;

DETAILED DESCRIPTION OF THE PREFERRED EMBODIMENTS

Embodiments of the present invention will be explained with reference to the accompanying drawings.

Figure 1:
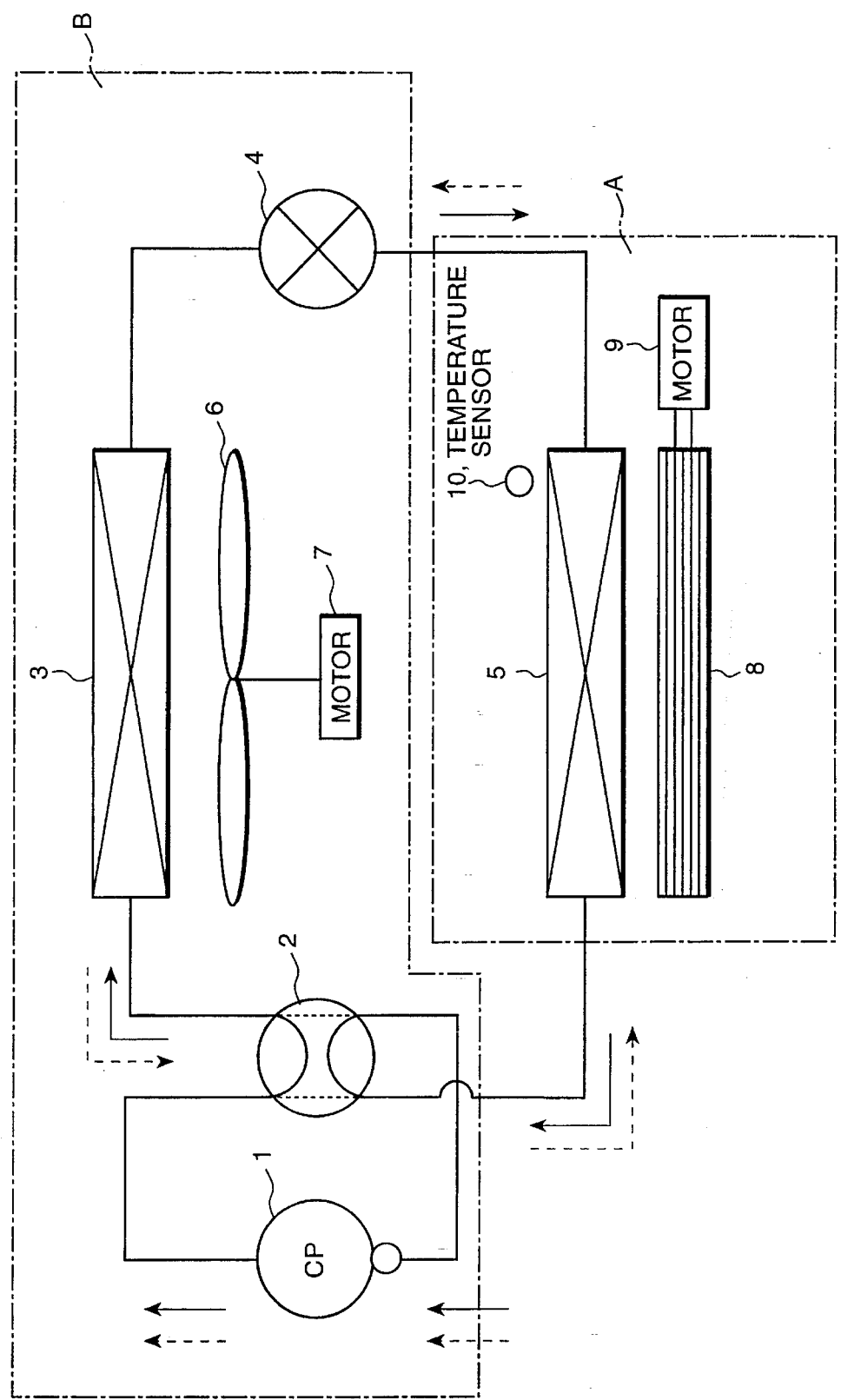
FIG. 1 is a schematic diagram of a refrigerant circuit of an air conditioner according to the present invention.

FIG. 1 shows a refrigerant circuit of a heat pump type air conditioner according to this invention. The air conditioner can work in a cooling mode to cool a room during the summer and a heating mode to heat a room during the winter. Solid line arrows show the direction of refrigerant flow during the cooling mode, and dotted line arrows show the refrigerant flow during the heating mode. Compressor 1 has compression mechanism 29 to compress the refrigerant and compressor motor 22 (shown in FIG. 2), both housed in a sealed case. In the cooling mode, refrigerant discharged from compressor 1 passes through four-way valve 2 which controls the direction in which refrigerant flows. Then, the refrigerant passes through outdoor heat exchanger 3, where heat is exchanged with outside air blown by outdoor fan 6. As a result, the refrigerant is condensed in outdoor heat exchanger 3. The refrigerant then passes through expansion valve 4 and is supplied to indoor heat exchanger 5. In indoor heat exchanger 5, the refrigerant absorbs heat from indoor air blown by indoor fan 8. Therefore, cool air from indoor heat exchanger 5 is blown into the room to be cooled. After the refrigerant is evaporated in indoor heat exchanger 5, it passes through four-way valve 2 and returns to the suction side of compressor 1.

In the heating mode, the direction of flow of the refrigerant is reversed by changing the position of four-way valve 2. After hot refrigerant has been supplied to indoor heat exchanger 5, it passes through outdoor heat exchanger 3 via expansion valve 4. In this mode, the refrigerant is condensed in indoor heat exchanger 5. Thus, the room air is heated.

Outdoor fan 6, which is rotated by outdoor fan motor 7, is positioned in the vicinity of outdoor heat exchanger 3. In this embodiment, a propeller fan is used as outdoor fan 6. Also, indoor fan 8, which is rotated by indoor fan motor 9, is positioned in the vicinity of indoor heat exchanger 5. A cross-flow fan is used as indoor fan 8. However, other types of fans can be used for each fan.

In this embodiment, the air conditioner is divided into two units, indoor unit A which is located inside the room to be air conditioned, and outdoor unit B which is located outside the room. Indoor heat exchanger 5, indoor fan 8 and indoor fan motor 9 are installed in indoor unit A. Compressor 1, four-way valve 2, outdoor heat exchanger 3, outdoor fan 6, outdoor fan motor 7 and expansion valve 4 are installed in outdoor unit B.

Figure 2:
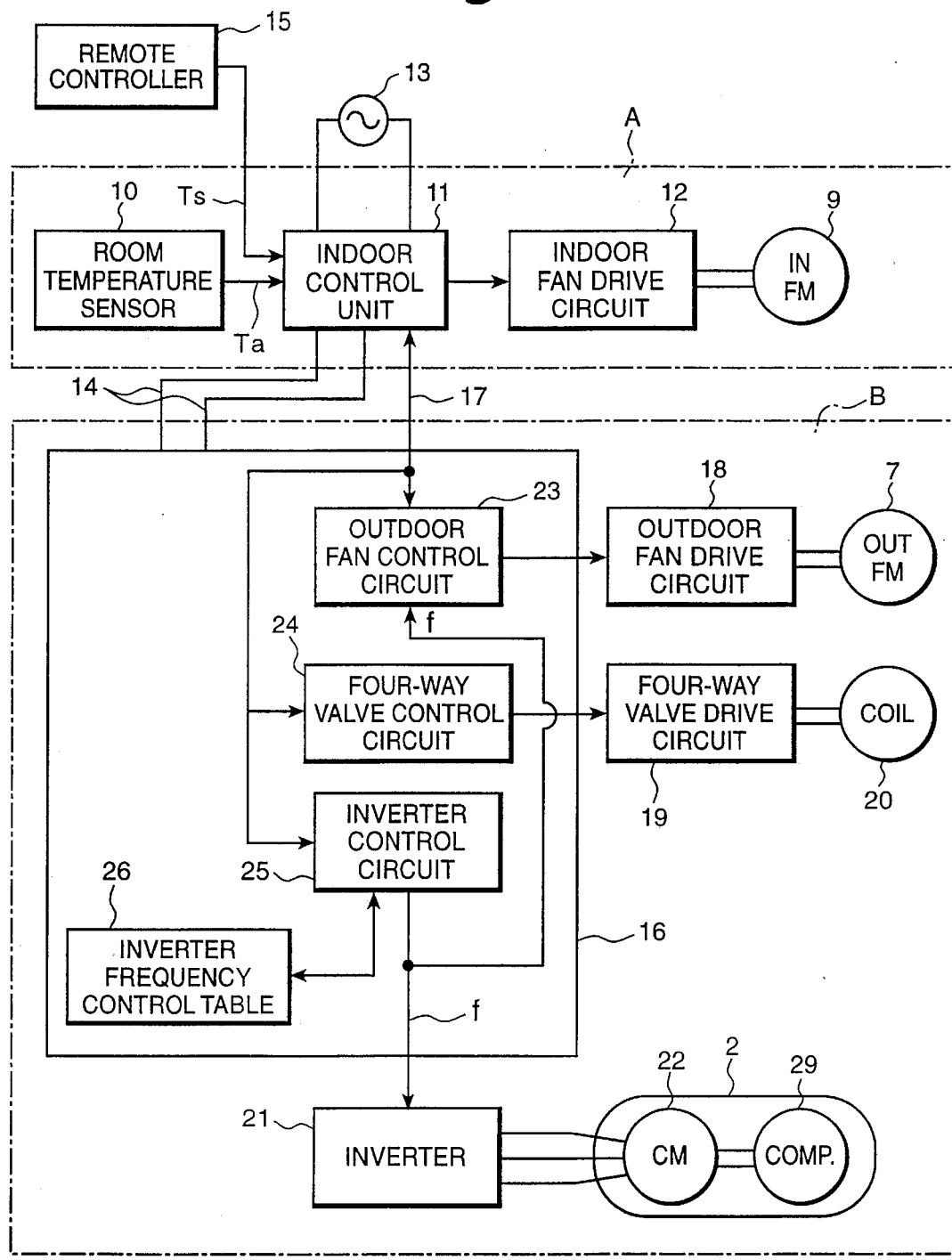
FIG. 2 is a block diagram showing electrical parts of the air conditioner.

FIG. 2 is a block diagram showing electrical parts of the air conditioner. In FIG. 2, room temperature sensor 10 which is provided in the path of air taken in by indoor fan 8, indoor control unit 11, indoor fan drive circuit 12 and indoor fan motor 9 are positioned in indoor unit A. Room temperature sensor 10, such as a thermistor, detects a room air temperature Ta. AC power source 13 is connected to indoor control unit 11, and AC power is supplied to outdoor control unit 16 inside outdoor unit B via power connection liens 14. Indoor control unit 11 controls indoor fan motor 9 via indoor fan drive circuit 12.

Remote controller 15 has a plurality of operating buttons or switches on its surface (not shown) which can be used to output various operating signals, including operation start/end instructions, mode instructions which indicate the cooling or heating mode, setting temperature Ts, and so on. The signals are transmitted by an infra-red ray. When indoor control unit 11 receives signals from remote controller 15, indoor control unit 11 transmits the data corresponding to the received signals to outdoor control unit 16 via control signal line 17. During operation of the air conditioner, indoor control unit 11 also transmits room air temperature Ta detected by room temperature sensor 10 to outdoor control unit 16 via control signal line 17.

Outdoor control unit 16, outdoor fan drive circuit 18, outdoor fan motor 7, four-way valve drive circuit 19, four-way valve coil 20, inverter 21 and compressor 2 are provided in outdoor unit B. Inverter 21 can output variable frequency AC power, and the variable frequency AC power is supplied to compressor motor 22. An output shaft of compressor motor 22 is connected to compression mechanism 29. Therefore, the compressor rotational speed is controlled by the output frequency of inverter 21. That is the air conditioning capacity of the air conditioner is controlled by the output frequency of inverter 21.

Outdoor control unit 16 includes outdoor fan control circuit 23, four-way valve control circuit 24, inverter control circuit 25 and inverter frequency control table 26. Outdoor fan control circuit 23 includes an operating mode detection circuit which detects whether the operation mode of the air conditioner is set for cooling or heating; a reference value setting circuit which sets the outdoor fan rotational speed reference value so that the value in the cooling mode is less than the value in the heating mode; and a outdoor fan speed selection circuit which selects either a high speed or a low speed for the outdoor fan based on the detected operation mode, the set reference value and inverter output frequency f outputted from inverter control circuit 25.

Inverter control circuit 25 calculates the difference $\Delta T$ between setting temperature Ts and detected room air temperature Ta, both of which being transmitted from indoor control unit 17. At the same time, inverter control circuit 25 detects the operation mode of the air conditioner. Then, inverter control circuit 25 reads out inverter output frequency f from inverter frequency control table 26 based on the operation mode and temperature difference $\Delta T$. The inverter output frequency f is supplied to inverter 21 and outdoor fan control circuit 23.

In this embodiment, outdoor fan motor 7 is an induction motor which has two speed selecting taps. Therefore, outdoor fan drive circuit 18 includes a switching circuit which changes the connection between a power source and the two speed selecting taps. However, other motors, for example, a DC motor or an indication motor having no taps, can also be used. When other motors are used, suitable driving circuits for changing the motor speed should also be used.

The contents of inverter frequency control table 26 are shown in FIG. 3. The inverter output frequency is controlled from 90 Hz to 0 Hz in the cooling mode, while the inverter output frequency is controlled from 130 Hz to 0 Hz in the heating mode. Values of inverter output frequency f are entered which correspond to the temperature difference $\Delta T$. The entries H (high speed), L (low speed) and OFF in the "Outdoor Fan Speed" column have been shown in order to make it easier to understand their relationship to frequency f. However, they are not actually included in inverter frequency control table 26. In practice, the outdoor fan rotational speed is determined by outdoor fan control circuit 23. Also, the table of FIG. 3 is an example for simple proportional control. However, PID control or fuzzy control could also be employed to determined the compressor rotational speed. When PID control or fuzzy control is used, the rate of change of room air temperature Ta should also be considered. Therefore, a table with more detailed divisions is used.

Usually, indoor control unit 11 includes a microprocessor and peripheral circuits such as A/D converters. Also, a microprocessor having a memory storing inverter frequency table 26 and a program for controlling outdoor fan drive circuit 18, four way valve drive circuit 19 and inverter 21 are used in outdoor control unit 16.

Figure 4:
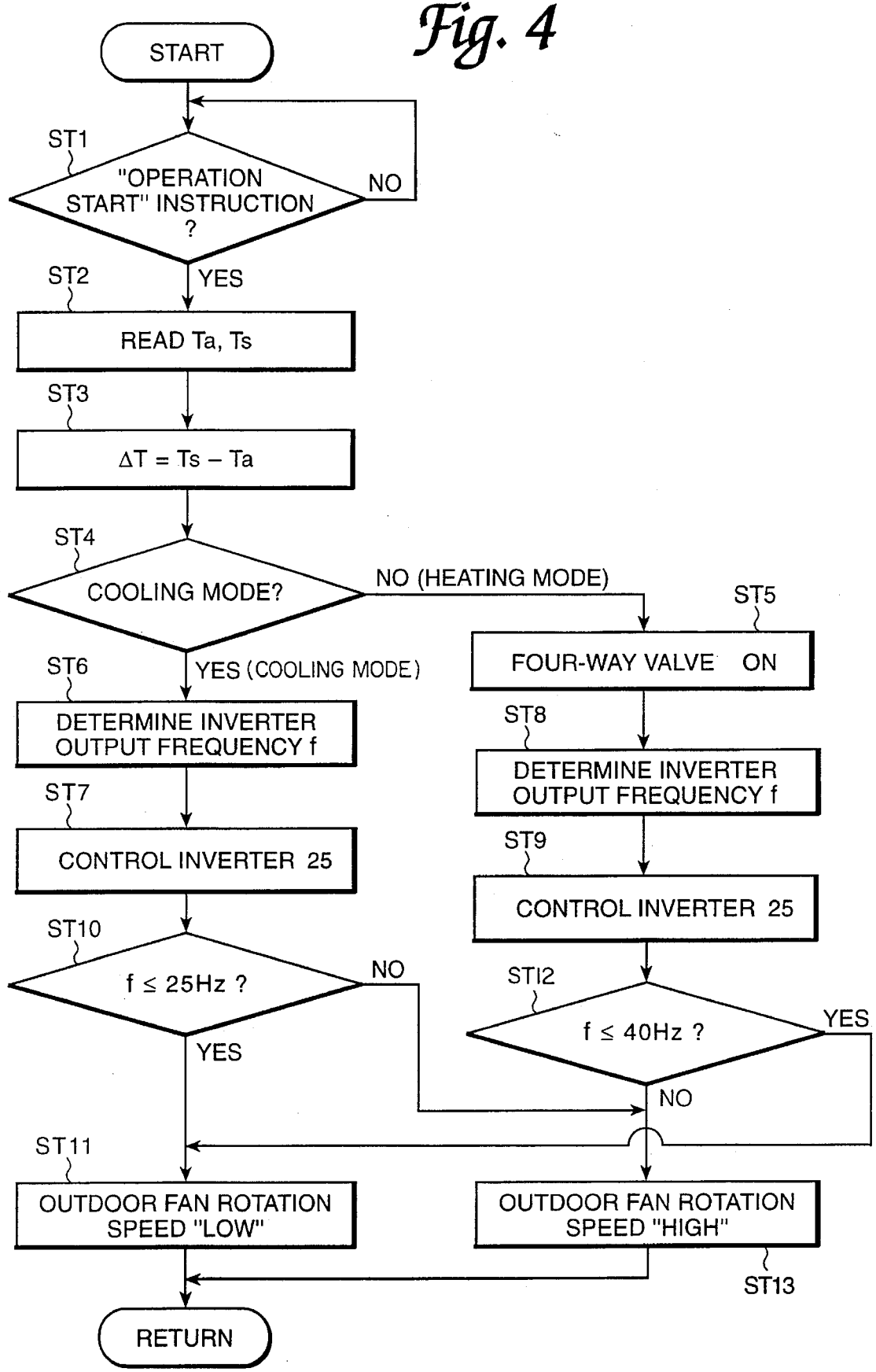
FIG. 4 is a flow-chart showing the operation of the indoor control unit and outdoor control unit shown in FIG. 2.

The operation of outdoor control unit 16 will be explained with reference to the flow-chart shown in FIG. 4. Outdoor control unit 16 determines whether an "Operation Start" instruction has been transmitted from remote control 15, received by indoor control unit 11 and transferred to outdoor control unit 16 (Step ST1). Once the instruction is transmitted, inverter control circuit 25 reads set temperature Ts and detected indoor temperature Ta which are transmitted from indoor control unit 11 (step ST2). Then, inverter control circuit 25 calculates the difference ΔT=Ts−Ta (step ST3). At the same time, outdoor control unit 16 determines whether the operation mode instruction, designated by remote controller 15 and transmitted from indoor control unit 11, is for cooling or heating (step ST4). If the operating mode is for heating, four-way valve control circuit 24 outputs a control instruction, which causes four-way valve drive circuit 19 to switch four-way valve 2 ON by conducting power to four-way valve coil 20 (step ST5).

If the operation is determined to be for cooling in step ST4, four-way valve 20 is not controlled. Then, inverter control circuit 25 determines inverter frequency f by picking out the value of f which corresponds to the value of ΔT in the cooling mode column shown in FIG. 3 (step ST6). Then, inverter control circuit 25 controls inverter 21 so that the output frequency of inverter 21 becomes f (step ST7). If the operation mode is determined to be for heating in step ST4, inverter frequency f is selected in the same way (steps ST8 and ST9). That is inverter control circuit 25 determines inverter frequency f by picking out the value of f which corresponds to the value of ΔT in the heating mode column shown in FIG. 3 and controls inverter 21.

In the cooling mode, 25 Hz is preset as the specified reference value for outdoor fan control circuit 23. In the heating mode, 40 Hz is preset as the specified reference value. Then, in the cooling mode, outdoor fan control circuit 23 judges whether inverter frequency f is 25 Hz or less (step ST10). If f≦25 (HZ), outdoor fan control circuit 23 outputs a low speed operation instruction to outdoor fan drive circuit 18 (step ST11). In the cooling mode, if f≧25 (Hz), outdoor fan control circuit 23 outputs a high speed operation instruction (step ST13). Also, in the heating mode, outdoor fan control circuit 23 judges whether inverter frequency f is 40 Hz or less (step ST12). If f≦40 (Hz), outdoor fan control circuit 23 outputs a low speed operation instruction to outdoor fan drive circuit 18 (step ST11), and if f>40 (Hz), it outputs a high speed operation instruction (step ST13).

When outdoor fan drive circuit 18 receives the low speed operation instruction, outdoor fan drive circuit 18 drives outdoor fan motor 7 at "Low" speed. While outdoor fan drive circuit 18 receives the high speed operation instruction, outdoor fan drive circuit 18 drives outdoor fan motor 7 at "High" speed.

Figure 5A:
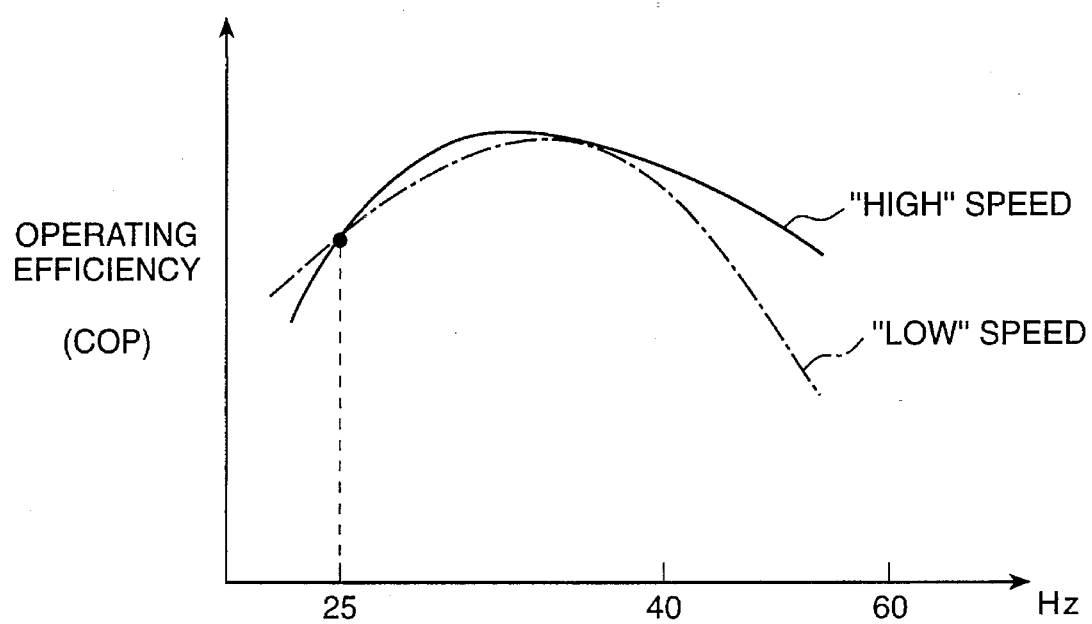
FIG. 5(a) is a graph of the relationship between the operating efficiency of the air conditioner and the inverter output frequency during the cooling mode.
Figure 5B:
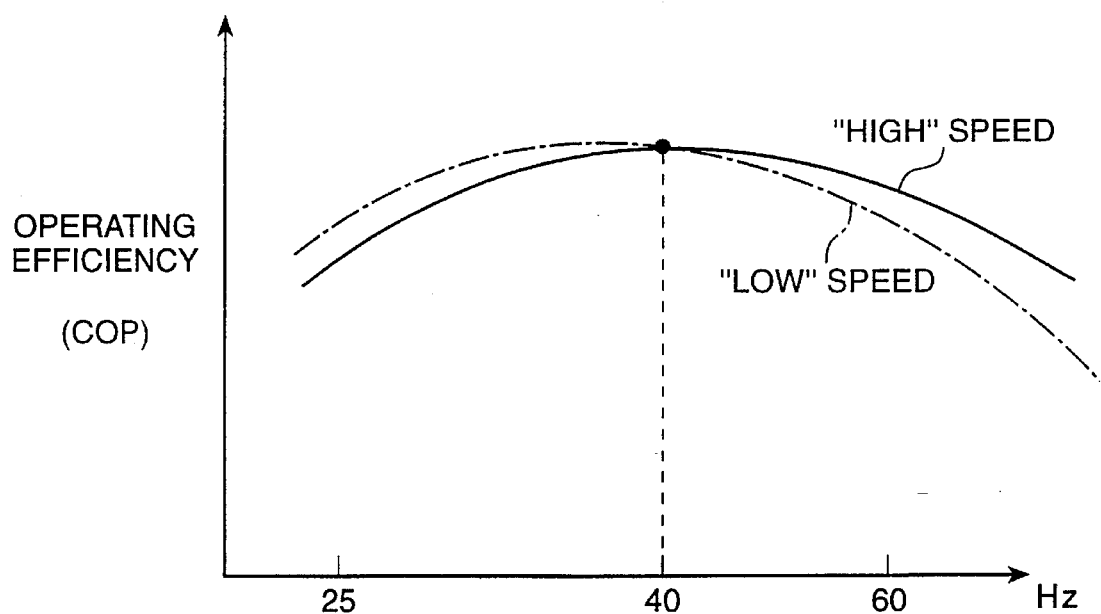
FIG. 5(b) is a graph of the relationship between the operating efficiency of the air conditioner and the inverter output frequency during the heating mode.

The relationships between inverter frequency f and operating efficiency (COP) of the air conditioner in the cooling mode are shown in FIG. 5(a). The relationships between inverter frequency f and operating efficiency (COP) of the air conditioner in the heating mode are shown in FIG. 5(b). Here, the operation efficiency is defined by the air conditioning capacity (kilocalories or W) divided by total energy consumption of the air conditioner, or electricity consumption (W). In FIGS. 5(a) and 5(b), the characteristic curve when outdoor fan 3 is operating at "High" speed (solid line) and the characteristic curve at "Low" speed (single-dot chain line) intersect each other.

As shown in FIG. 5(a), in the cooling mode, when the outdoor fan rotational speed is "High", the operating efficiency of the air conditioner has a peak at about 30 Hz. When the outdoor fan rotational speed is "Low", the operating efficiency of the air conditioner has a peak at about 35 Hz. The large volume air passing through outdoor heat exchanger 3 increases the air conditioning capacity. However, at low inverter output frequencies the improvement of air conditioner capacity is relatively lower than the increased electricity consumption caused by the increased outdoor fan speed. For this reason, when inverter output frequency f is lower than 25 Hz, the operating efficiency at "Low" speed outdoor fan operation is higher than that at "High" speed. In this embodiment, when inverter output frequency f is 25 Hz or less in the cooling mode, the outdoor fan rotational speed is set at "Low" speed, and when inverter output frequency f is more than 25 Hz in the cooling mode, the outdoor fan rotational speed is set to be "High". Therefore, the air conditioner always operates at the higher operating efficiency in the cooling mode.

In heating mode, when inverter output frequency f is greater than 40 Hz, the operating efficiency at "High" speed outdoor fan operating is higher than that at "Low" speed as shown in FIG. 5(b). The difference between the cooling and heating characteristic curves is caused by the difference in heat exchanger volume and the temperature difference between the outdoor heat exchanger and the outside air. When inverter output frequency f is 40 Hz or less in the heating mode, the outdoor fan rotational speed is set at "Low", and when inverter output frequency f is more than 40 Hz in the heating mode, the outdoor fan rotational speed is set at "High". Therefore, as in the cooling mode, the air conditioner always operates at the higher operating efficiency in the heating mode.

Figure 6A:
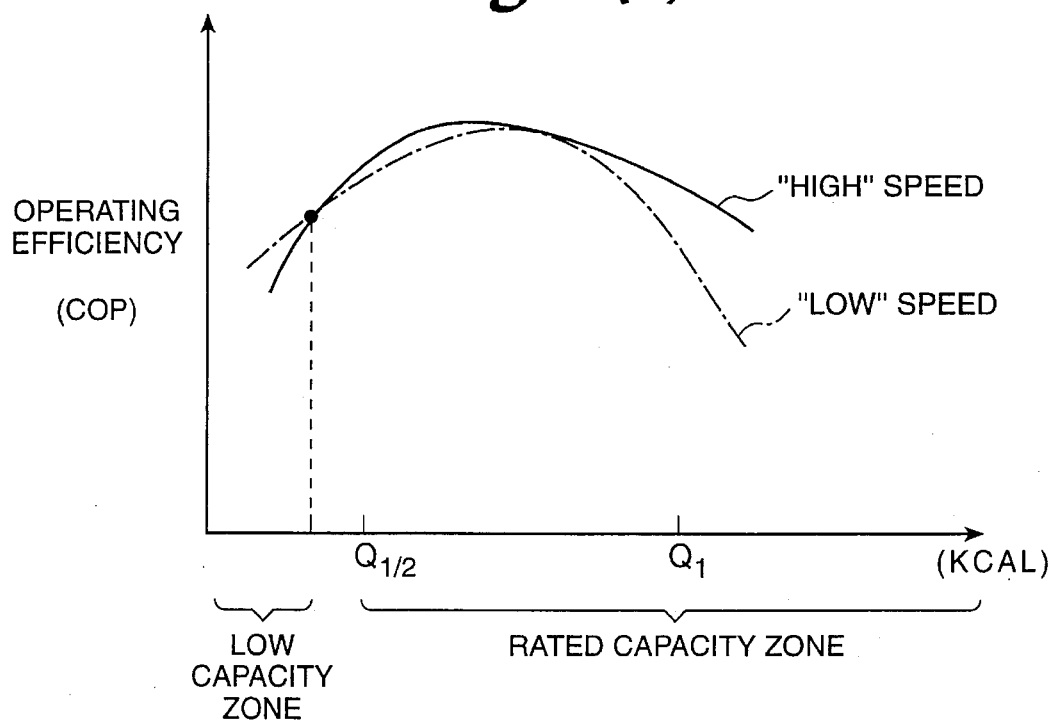
FIG. 6(a) is a graph of the relationship between the operating efficiency of the air conditioner and the air conditioning capacity of the air conditioner during the cooling mode.
Figure 6B:
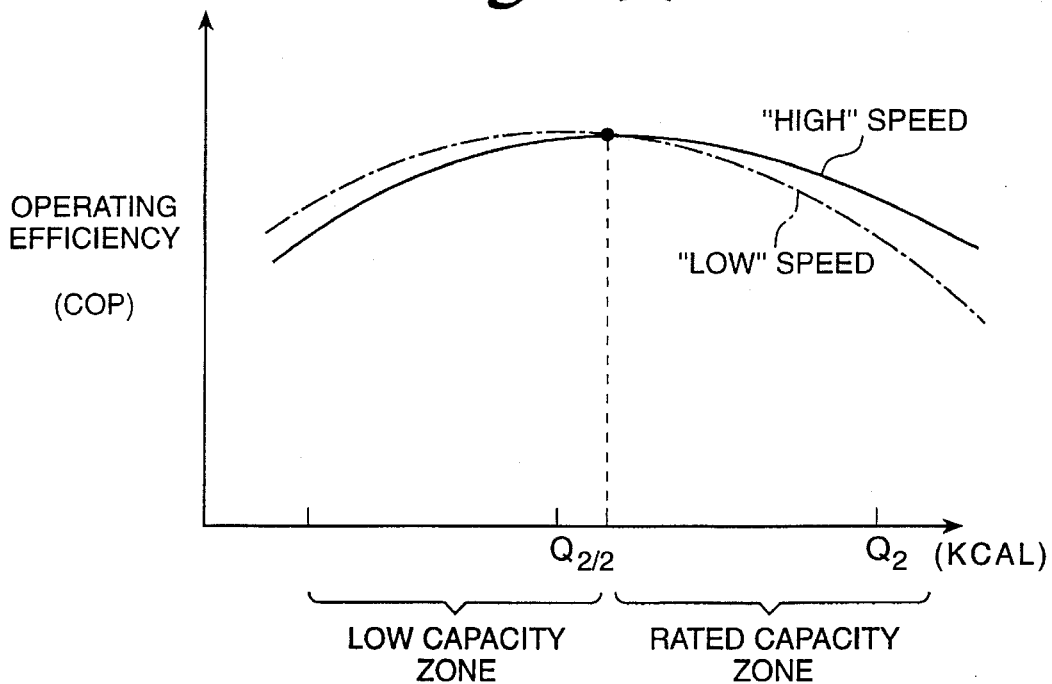
FIG. 6(b) is a graph of the relationship between the operating efficiency of the air conditioner and the air conditioning capacity of the air conditioner during the heating mode.

In the above embodiment, the "High" speed/"Low" speed switching of outdoor fan motor 7 occurs in accordance with the inverter output frequency f, that is to say, the compressor rotational speed. However, as an alternative embodiment, it may also be designed to perform switching according to the air conditioner capacity (the units being kilocalories or W). As shown in FIGS. 6(a) and 6(b), air conditioning capacity increases along the horizontal axis. Air conditioning capacity is divided into a rated capacity zone and a low capacity zone. Thus, the speed of the outdoor fan motor may also be switched using the boundary values of these zones as references. If cooling rated capacity value $Q_1$ and heating rated capacity value $Q_2$ are determined in the rated capacity zones of FIGS. 6(a) and 6(b), it is clear that, in the cooling mode the boundary value becomes lower than $Q_1/2$ and also, in the heating mode, the boundary value becomes higher than $Q_2/2$. Therefore, the boundary values for outdoor fan speed switching can readily be found.

Figure 7:
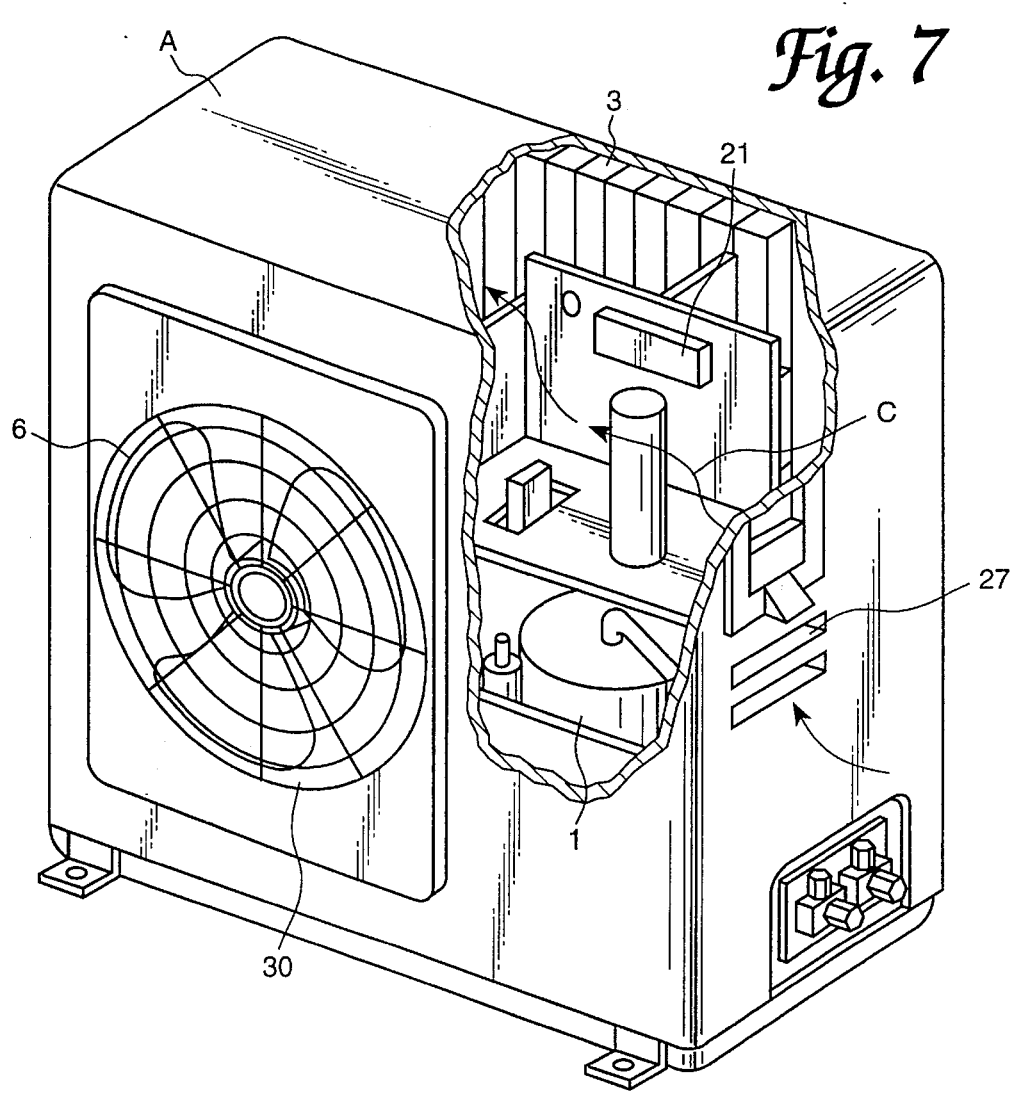
FIG. 7 is a perspective view of the outdoor unit of the air conditioner.
Figure 8:
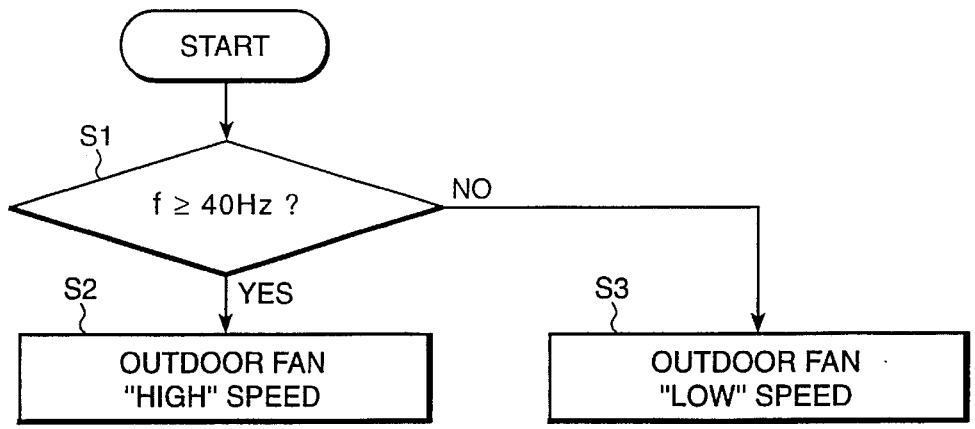
FIG. 8 is a flow-chart of the outdoor fan control in a conventional air conditioner.

Another merit of these embodiments will now be explained. The construction of the outdoor unit is shown in FIG. 7. Outdoor fan 6 is mounted in the front of outdoor unit B. Outdoor heat exchanger 3 is positioned at the rear of outdoor unit B. Compressor 1 and various electrical components including inverter 21 are housed inside outdoor unit B. At one side of outdoor unit B, air intake port 27 is provided. In outdoor unit B, when outdoor fan 6 is rotated, outside air enters through air intake port 27. The air passes over inverter 21 and the other electrical components. Then the air is exhausted from outdoor fan air outlet 30 provided in front of outdoor fan 6 together with air passing through outdoor heat exchanger 3. The air flow path between air intake port 27 and outdoor fan 6 is shown by arrow C.

In this configuration, during the cooling mode, electrical components, especially inverter 21, generate heat. Thus, the temperature surrounding inverter 21 rises significantly. Therefore, inverter 21 is in a severe environment. However, the electrical components including inverter 21 are positioned in air flow path C. Therefore, the electrical components are cooled by the air flow produced by outdoor fan 6. Furthermore, to maintain a high cooling effect for inverter 21, it is preferable that outdoor fan 6 should be rotated at as high a speed as possible. In this embodiment, the reference value in the cooling operation (25 Hz) is made much lower than the reference value in the heating operation (40 Hz). Therefore, outdoor fan 6 will be operated at high speed for the greater part of the time during the cooling operation. Consequently, from the viewpoint of the cooling effect for inverter 21 during the cooling operation, this embodiment has a composition which is highly desirable.

Many changes and modifications in the above described embodiments can be carried out without departing from the scope of general inventive concept as defined by the appended claims and their equivalents.

What is claimed is:

1. A heat pump type air conditioner comprising:

a refrigeration circuit including a variable speed compressor, a four-way valve, an indoor heat exchanger, an expansion device and an outdoor heat exchanger, and capable of operating in a cooling mode to cool a room and a heating mode to heat the room;

compressor speed setting means for setting the compressor rotational speed;

an outdoor fan blowing air through the outdoor heat exchanger which selectably rotates at one of a high speed and a low speed; and outdoor fan speed selecting means for selecting either the high speed or the low speed of the outdoor fan based on the operation mode, a cooling mode reference compressor rotational speed value, a heating mode reference compressor rotational speed value and the set compressor rotational speed, the cooling mode reference compressor rotational speed value being smaller than the heating mode reference compressor rotational speed value.

2. A heat pump type air conditioner according to claim 1, wherein the compressor speed setting means comprises:

a temperature setting means for setting a desired room temperature;

a temperature sensor for detecting a room air temperature; and compressor rotational speed determining means for determining the compressor rotational speed in accordance with the setting room temperature, the detected room air temperature and the operation mode of the air conditioner.

3. A heat pump type air conditioner according to claim 1, wherein the outdoor fan selecting means includes mode determining means for determining the operation mode of the air conditioner.

4. A heat pump type air conditioner according to one of claims 1 to 3, wherein, in the cooling mode, the outdoor fan speed selecting means selects the high speed when the setting compressor rotational speed is more than the cooling reference value, and the outdoor fan speed selecting means selects the low speed when the setting compressor rotational speed is not more than the cooling reference value.

5. A heat pump type air conditioner according to one of claim 1 to 3, wherein, in the heating mode, the outdoor fan speed selecting means selects the high speed when the setting compressor rotational speed is more than the heating reference value, and the outdoor fan speed selecting means selects the low speed when the setting compressor rotational speed is not more than the heating reference value.

6. A heat pump type air conditioner according to claim 1, further including four-way valve controlling means for controlling the direction of refrigerant flowing in the refrigeration circuit by changing the connection of the four-way valve in accordance with the operation mode of the air conditioner.

7. A heat pump type air conditioner according to claim 6, wherein the four-way valve controlling means includes mode determining means for determining the operation mode of the air conditioner.

8. A heat pump type air conditioner comprising:

refrigeration circuit including a compressor, a four-way valve, an indoor heat exchanger, an expansion device and an outdoor heat exchanger, and capable of operating in a cooling mode to cool a room and a heating mode to heat the room;

a compressor motor driving the compressor;

an inverter supplying variable frequency power to the compressor motor;

an outdoor fan blowing air through the outdoor heat exchanger which selectably rotates at one of a high speed and a low speed;

an outdoor unit having an air intake port and housing the inverter and the outdoor fan, the inverter being positioned in an air path which connects the air intake port and the outdoor fan;

compressor speed setting means for setting the compressor rotational speed; and outdoor fan speed selecting means for selecting either the high speed or the low speed of the outdoor fan based on the operation mode, a cooling mode reference compressor rotational speed value, a heating mode reference compressor rotational speed value and the set compressor rotational speed, the cooling mode reference compressor rotational speed value being smaller than the heating mode reference compressor rotational speed value.

9. A method for controlling a heat pump type air conditioner having a refrigeration circuit including a variable speed compressor, a four-way valve, an indoor heat exchanger, an expansion device, an outdoor heat exchanger, and an outdoor fan blowing air through the outdoor heat exchanger which selectably rotates at a high speed and a low speed, the refrigeration circuit being capable of operating a cooling mode to cool a room and a heating mode to heat the room, comprising the steps of:

setting the compressor rotational speed; and selecting either the high speed or the low speed for the outdoor fan based on the operation mode, a cooling mode reference compressor rotational speed value, a heating mode reference compressor rotational speed value and the set compressor rotational speed, the cooling mode reference compressor rotational speed value being smaller than the heating mode reference compressor rotational speed value.

10. A method for controlling a heat pump type air conditioner according to claim 9, wherein the setting step comprises the steps of:

setting a desired room temperature;

detecting a room air temperature; and determining the compressor rotational speed in accordance with the setting room temperature, the detected room air temperature and the operation mode of the air conditioner.

11. A method for controlling a heat pump type air conditioner according to claim 9, wherein the selecting step includes the step of detecting the operation mode of the air conditioner.

12. A method for controlling a heat pump type air conditioner according to claim 9, wherein, in the cooling mode the selecting step selects the high speed when the setting compressor rotational speed is more than the cooling reference value, and the low speed when the setting compressor rotational speed is not more than the cooling reference value.

13. A method for controlling a heat pump type air conditioner according to claim 9, wherein, in the heating mode, the selecting step selects the high speed when the setting compressor rotational speed is more than the heating reference value, and the low speed when the setting compressor rotational speed is not more than the heating reference value.

* * * * *